J. Houpt,

Steam Condenser.

No. 3999. Reissued May 31. 1870

Witnesses:

Benj Morison

Wm H. Morison.

Inventor:

John Houpt

N. PETERS, PHOTO-LITHOGRAPHER, WASHINGTON, D. C.

UNITED STATES PATENT OFFICE.

JOHN HOUPT, OF SPRINGTOWN, PENNSYLVANIA.

IMPROVEMENT IN STEAM-CONDENSERS.

Specification forming part of Letters Patent No. 102,005, dated April 19, 1870; Reissue No. 3,999, dated May 31, 1870.

*To all whom it may concern:*

Be it known that I, JOHN HOUPT, of Springtown, in the county of Bucks and State of Pennsylvania, have invented certain Improvements in Condensers for Steam-Engines, of which the following is a specification.

My invention relates more especially to an improvement in condensing steam-engines for which Letters Patent were granted to me dated the 18th day of May, 1869, the said improvement consisting in the combination of a plurality of condensers with a single steam-cylinder, for the purpose therein specified, the said condensers, when more than one set are used for each end of the cylinder, acting independently of each other, but for the single purpose of producing the required vacuum in front of the piston. My present invention, however, while it divides the exhaust-steam into two portions, as required in my said patented invention, differs in this, in that it produces instantly, and without the use of an air-pump, a more perfect vacuum in front of the piston by condensing only one of the two portions of the exhaust-steam, for the purpose of producing the said vacuum, while the other portion is either condensed in a separate or independent chamber over the usual hot well, as required in marine engines, or is allowed to escape from said chamber into the open air, as in stationary or land engines, where there is an abundance of fresh water to supply the boilers.

Figure 1:
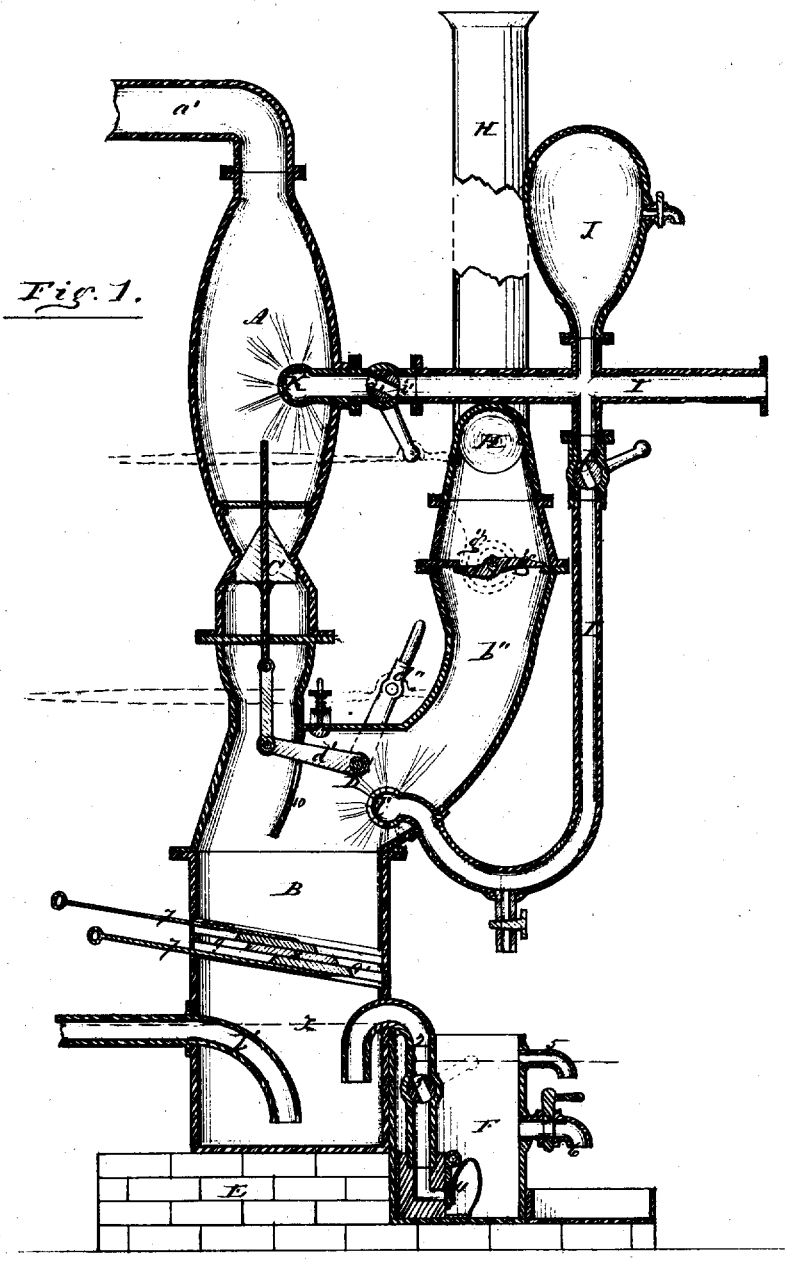
Figure 2:
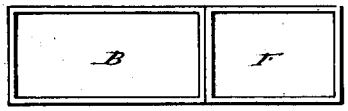

In the accompanying drawings, Figure 1 is a vertical longitudinal central section embodying my invention, and Fig. 2 is a sectional plan view of the lower portion of Fig. 1.

A is a condensing-chamber, which is intended to be connected with the steam-cylinder of the engine by means of the exhaust-pipe *a'*, which is secured to its upper end. This chamber A may be called the "primary condenser," and is of the spindle form, and supported in a vertical position upon an elevated portion of the upper end of a more capacious chamber, B, which latter may be called the "secondary condenser." The lower end of the primary condenser A opens into the secondary condenser B, but is fitted with a spindle-valve, C, whereby the said opening between the two chambers A and B is periodically closed by a positive motion given to the valve by a rock-shaft, D, which passes horizontally through the upper part of the chamber B, and has a fixed arm, *d'*, which is articulated to the lower end of the spindle of the said valve C, motion being given to the rock-shaft D by means of a lever, *d''*, and the usual detachable connecting-rod operated by the engine. The secondary condenser B is a rectangular chamber, which is fixed to rest securely upon a substantial base, E, its lower portion constituting the hot well, with a pipe, *b'*, which leads to the usual pump for supplying water to the boiler, and a siphon-pipe, 2, which passes out through the one side of chamber B, and is fitted with an adjustable hand-valve, 3, near its upper part, outside of the chamber, for the purpose of regulating thereby the height of the water in the hot well, and with a spring-valve, 4, at its lower end for preventing an accidental return of water, the said outside portion of the siphon-pipe 2 extending down into and nearly to the bottom of an outside water-receiver or waste-well F, which is fitted with an overflow-spout, 5, and a lowering-cock, 6.

Above the hot-well water-line *x* in the secondary condenser B a pair of adjustable slides, 7 7, are fitted, so that they can be moved by hand over the opposite sides of an inclined partition, 8, which has two openings, 9 9', through it, that can be either closed or varied in area by moving the slides accordingly. The upper portion of the secondary condenser B is divided transversely by a curved upright partition, 10, which extends downward toward the middle of the partition 8, containing the slides 7 7, the arm *d'* on the rock-shaft D working in a roomy slot in the said partition 10. On the rock-shaft side of the partition 10 the secondary condenser B extends in a curve upward, so as to afford an elevated continuation, *b''*, which serves as a support for an elevated escape pipe or flue H.

Between the parts *b''* and H there is placed an overbalanced valve, *g'*, closed in its normal condition, but yielding upward to a puff of steam from the primary condenser A to let out the air, but immediately closing again, the tendency of which is to keep the chamber B closed against the undue escape of steam, and also to effectually prevent any rush of air into the said chamber B through the escape-pipe H, when a vacuum is produced in the chamber.

Attached to the valve $g'$ is a slender spring-coil, $g''$, which prevents the valve from accidentally remaining open.

I is a pipe provided with an air-pressure equalizer, J, and communicates at one end with any sufficient head of cold water, and at the other end with a jet-spreader, K, that is fixed to discharge in the center of the primary condenser A, when the stop-valve $i'$ is opened, the said valve $i'$ being intended to be opened periodically by a positive motion derived from a cam or eccentric, through an adjustable connecting-rod operated by the engine in the usual manner.

Branching down from the pipe I is another pipe, L, which, by an upward curve, enters through the underside of divisions $b''$ of the secondary condenser B, and, turning downward a short distance, ends in a jet-spreader, $l'$. This pipe L also has a stop-valve, $l''$, which may be opened periodically by a positive motion from a cam or eccentric derived through an adjustable connecting-rod, operated by the engine in the usual manner; or it may be adjusted to keep the jet-spray of $l'$ constantly running, if preferred.

The different parts described being connected together substantially as set forth, and the pipe $a'$ connected to the usual exhaust-chest of the valve or valves of the steam-cylinder of the engine, the moving parts are then to be adjusted to operate as follows, viz: Immediately before the crank of the engine reaches its dead-point the exhaust-valve of the steam-cylinder and the valve C open, and thus allow the first puff of high steam from the steam-cylinder to pass down through the primary condenser A, driving the air and any water of condensation which may be therein before it into the secondary condenser B, when the valve C instantly closes, and the valve $i'$ opens and lets a copious spray of cold water be discharged through the jet-spreader K, which instantly condenses all the steam in the said condenser A, and thus produces in front of the piston as perfect a vacuum as can be produced in a condenser. The puff of high steam, which had just previously passed out of the primary condenser A into the secondary condenser B, continues down through the adjusted opening 9 in the partition 8 into contact with the surface of the water in the hot well in the lower part of the chamber B, and thence, partially condensed up, through the opposite opening, 9′, into the partition 8, into the division $b''$, forcing the air therein out through the yielding valve $g'$, which then instantly closes, and the confined steam, being subjected to the spray of cold water from the jet-spreader $l'$, is thereby wholly condensed, thus producing a partial vacuum in the secondary condenser B, the water falling down through the partition 8 into the hot well beneath. Should the vacuum produced in the secondary condenser B cause the water in the hot well to rise, the spring-valve 4 in the secondary well F closes, and consequently arrests its progress.

The cold-water jet $l'$ in the secondary condenser B is required in marine engines only, for the purpose of saving a sufficient quantity of the water of condensation to keep the boiler supplied; but in land-engines the first puff of steam which passes through the primary condenser A at each exhaust of the cylinder, after passing from the hot well up through the division $b''$ in a partially condensed or cooled state, forces open the valve $g'$ and escapes, leaving the secondary condenser B with an imperfect vacuum, but nevertheless in a condition very favorable to the entrance of the next puff of high steam, together with the water of condensation left in the primary condenser A in making the preceding vacuum therein.

The described apparatus may have the pipe $a'$ made to communicate either with both or with only one of the exhausts of the steam-cylinder of the engine, as may be deemed necessary or expedient, using either a double or single apparatus, as the adoption of either arrangement may require.

It will be evident, without any further description or explanation, that, as the vacuum required in front of the piston is produced by operating on less than one-half of the exhaust-steam liberated just before each stroke of the piston, and the consequent expulsion thereby of the air in the primary condenser, through which the puff passes, a more perfect and rapid condensation of the said steam will be effected, and consequently a more perfect vaccum produced in front of the piston by means of my present invention than any hitherto produced for the purpose.

It will also be evident that, as my primary is a self-cleaning condenser, or does not require the co-operation of an air-pump, there will be a saving in fuel adequate to the amount heretofore required to operate the air-pump in low-pressure engines having the same sized steam-cylinder, while the condenser itself is much more simple and less costly in construction.

I claim as my invention—

1. The arrangement and combination of a primary condenser and a secondary condenser with an intervening valve, for the purpose of dividing the exhaust-steam preceding each stroke of the piston of a steam-cylinder into two parts, in such a manner as to retain the smaller portion of the high steam of the exhaust within the primary condenser A for condensation, and the consequent production of a more perfect vacuum in front of the piston in the said cylinder, substantially as hereinafter set forth.

2. In combination with the primary condenser A, the secondary condenser B, and the valve C, arranged as described, the employment of a cold-water jet-spreader, $l'$, in the secondary condenser B, the same being arranged to operate therein, substantially as and for the purpose hereinbefore set forth.

3. In combination with the primary condenser A, the secondary condenser B, and the valve C, arranged as described, the employment of the overbalanced valve $g'$, arranged to operate between the space $b''$ in the secondary condenser B, and the escape-pipe H, substantially as and for the purpose hereinbefore set forth.

4. The primary condenser consisting of the chamber A, cold-water jet-spreader K, and the valve C, operating together, as and for the purpose described, in combination with any suitable hot well or receiver of the water of condensation and the steam coming from the said primary condenser, so that the water in said hot well or receiver will be heated for supplying the boilers or steam-generators of a land or fresh-water engine, and the surplus steam allowed to escape.

JOHN HOUPT.

Witnesses:
BENJ. MORISON,
WM. H. MORISON.